US009513927B1

(12) United States Patent
Sivertsen (10) Patent No.: US 9,513,927 B1
(45) Date of Patent: Dec. 6, 2016

(54) METHOD AND IMPLEMENTATION FOR PLAYING MEDIA CONTENT WHILE BOOTING THE SOFTWARE OF AN SOC OR COMPUTER SYSTEM

(71) Applicant: AMERICAN MEGATRENDS, INC., Norcross, GA (US)

(72) Inventor: Clas Gerhard Sivertsen, Lilburn, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 192 days.

(21) Appl. No.: 14/048,588

(22) Filed: Oct. 8, 2013

(51) Int. Cl.
*G06F 9/44* (2006.01)

(52) U.S. Cl.
CPC ........... *G06F 9/4406* (2013.01); *G06F 9/4401* (2013.01)

(58) Field of Classification Search
None
See application file for complete search history.

(56) References Cited

U.S. PATENT DOCUMENTS

| | | | | |
|---|---|---|---|---|
| 5,694,143 | A * | 12/1997 | Fielder et al. | 345/519 |
| 6,564,318 | B1 * | 5/2003 | Gharda et al. | 713/2 |
| 8,502,827 | B1 * | 8/2013 | Herz | G06F 9/4401 |
| | | | | 345/501 |
| 2007/0198971 | A1 * | 8/2007 | Dasu et al. | 717/140 |
| 2012/0017072 | A1 * | 1/2012 | Gillespie | 713/2 |
| 2012/0079029 | A1 * | 3/2012 | Damola et al. | 709/204 |
| 2014/0363144 | A1 * | 12/2014 | Zhou | G06F 9/4406 |
| | | | | 386/355 |

OTHER PUBLICATIONS

Dandamundi, Sivarama. (2003) Interrupts. In Fundamentals of Computer Organization and Design (pp. 825-862). New York: Springer-Verlag New York Inc.

* cited by examiner

*Primary Examiner* — Paul Yanchus, III
*Assistant Examiner* — Joshua Neveln
(74) *Attorney, Agent, or Firm* — Locke Lord LLP; Tim Tingkang Xia, Esq.

(57) ABSTRACT

Certain aspects direct to a computing device, which include a processor, a random access memory (RAM) having a frame buffer, a video controller configured to read video data from the frame buffer, and a non-volatile memory. The non-volatile memory stores an operating system, a media player, and first video data. The processor is configured to load the boot program to the RAM and execute the boot program. The boot program is configured to, when executed at the processor, boot the operating system in a first process or thread of the boot program, and load the media player and execute the media player in a second process or thread separate from a first process or thread. The media player is configured to, when executed by the processor, read the first video data from the non-volatile memory, and write second video data representing the first video data to the frame buffer.

25 Claims, 7 Drawing Sheets

METHOD AND IMPLEMENTATION FOR PLAYING MEDIA CONTENT WHILE BOOTING THE SOFTWARE OF AN SOC OR COMPUTER SYSTEM

FIELD

The present disclosure generally relates to booting processes of computing devices, and more particularly to techniques of utilizing a boot program to display media content during the booting process of the computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many electronics products today such as smart-phones and smart-TVs have operating systems that require a long time to boot, during which time the user have to wait from the time the power button is pressed until the operating system is fully loaded before some media content can be displayed. For example, normal BIOS boot and Linux OS or other OS boot can take typically 10-15 seconds or longer.

Therefore, heretofore unaddressed needs still exist in the art to address the aforementioned deficiencies and inadequacies.

SUMMARY

Certain aspects of the present disclosure direct to a computing device, which include a processor, a random access memory (RAM) having a frame buffer, a video controller configured to read video data from the frame buffer, and a non-volatile memory. The non-volatile memory stores an operating system, a media player, and first video data. The processor, the RAM, the video controller, and the non-volatile memory are in communication with each other. The processor is configured to load the boot program to the RAM and execute the boot program. The boot program is configured to, when executed at the processor, boot the operating system in a first process or thread of the boot program, and load the media player and execute the media player in a second process or thread separate from a first process or thread. The media player is configured to, when executed by the processor, read the first video data from the non-volatile memory, and write second video data representing the first video data to the frame buffer.

In certain embodiments, the first video data is in a first video format, the second video data is in a second video format supported by the video controller, and the media player is configured to convert the first video data to the second video data.

In certain embodiments, the first video data are in a format supported by the video controller video, the second video data are the same as the first video data, and the media player is configured to read the first video data from the non-volatile memory and writes the first video data directly to the frame buffer.

In certain embodiments, the boot program is configured to, when executed by the processor, initialize the RAM and the video controller.

In certain embodiments, the boot program is configured to terminate the media player before loading a loader of the operating system into the RAM.

In certain embodiments, the non-volatile memory further stores a converter application that is configured to run on the operating system. The converter application is configured to, when executed by the processor, process a media file in a third video format to generate the first video data, and store the first video data at a first predetermined location of the non-volatile memory.

In certain embodiments, the media player is configured to, when executed by the processor, read video data at the first predetermined location.

In certain embodiments, the non-volatile memory further stores a downloader application that is configured to run on the operating system, and the downloader application is configured to, when executed by the processor, download the media file from a network location.

In certain embodiments, the computing device includes: a display device in communication with the video controller; and an audio controller in communication with a speaker and configured to read audio data from an audio memory space of the RAM. The non-volatile memory further stores first audio data. The media player is configured to, when executed by the processor, read the first audio data from the non-volatile memory, and write second audio data representing the first video data to the audio memory space.

In certain embodiments, the operating system is stored in a first partition of the non-volatile memory, and the boot program, the media player, the first video data, and first audio data are stored in the second partition of the non-volatile memory.

Certain aspects of the present disclosure direct to a method of booting a computing device, which includes: loading a boot program from a non-volatile memory into a random access memory (RAM) and executing, at a processor, the boot program; booting, by the boot program executed at the processor, an operating system in a first process or thread of the boot program; loading and executing, by the boot program executed at the processor, a media player in a second process or thread of the boot program separated from the first process or thread; reading, by the media player executed at the processor, first video data from the non-volatile memory; and writing, by the media player executed at the processor, second video data representing the first video data to a frame buffer of the RAM, wherein a video controller is configured to read video data from the frame buffer.

In certain embodiments, the method further includes: converting, by the media player executed at the processor, the first video data in a first video format to the second video data in a second video format supported by the video controller.

In certain embodiments, the first video data are in a format supported by the video controller, the second video data are the same as the first video data, and the first video data is directly written to the frame buffer.

In certain embodiments, the method further includes: initializing, by the boot program executed at the processor, the RAM and the video controller.

In certain embodiments, the method further includes: terminating, by the boot program executed at the processor, the media player; and after terminating the media player, loading, by the boot program executed at the processor, a loader of the operating system into the RAM.

In certain embodiments, the method further includes: loading a downloader application from the non-volatile memory to the RAM, and executing, at the processor, the downloader application on the operating system; downloading, by the downloader application executed at the processor, a media file in a third video format from a network location; loading a converter application from the non-volatile memory into the RAM, and executing, at the processor, the converter application on the operating system; processing, by the converter application, the media file to generate the first video data; and storing, by the converter application executed at the processor, the first video data at a first predetermined location of the non-volatile memory.

In certain embodiments, the method further includes: reading, by the media player executed at the processor, video data at the first predetermined location.

In certain embodiments, the method further includes: reading, by the media player executed at the processor, first audio data from the non-volatile memory; and writing, by the media player executed at the processor, second audio data representing the first audio data to an audio memory space of the RAM, wherein an audio controller is configured to read audio data from the audio memory space.

Certain aspects of the present disclosure direct to a non-transitory computer readable medium storing computer executable codes for booting a computing device. The codes are configured to: load a boot program from a non-volatile memory into a random access memory (RAM) and execute, at a processor, the boot program; boot, by the boot program executed at the processor, an operating system in a first process or thread of the boot program; load and execute, by the boot program executed at the processor, a media player in a second process or thread of the boot program separated from the first process or thread; read, by the media player executed at the processor, first video data from the non-volatile memory; and write, by the media player executed at the processor, second video data representing the first video data to a frame buffer of the RAM, wherein a video controller is configured to read video data from the frame buffer.

In certain embodiments, the first video data is in a first video format, the second video data is in a second video format supported by the video controller, and the media player is configured to convert the first video data to the second video data.

In certain embodiments, the first video data are in a format supported by the video controller, the second video data are the same as the first video data, and the media player is configured to read the first video data from the non-volatile memory and writes the first video data directly to the frame buffer.

In certain embodiments, the boot program is configured to terminate the media player before loading a loader of the operating system into the RAM.

In certain embodiments, the codes include a downloader application and a converter application that are configured to run on the operating system. The downloader application is configured to, when executed by the processor, download a media file in a third video format from a network location. The converter application is configured to, when executed by the processor, process the media file to generate the first video data, and store the first video data at a first predetermined location of the non-volatile memory.

In certain embodiments, the media player is configured to, when executed by the microcontroller, read video data at the first predetermined location.

In certain embodiments, the codes are further configured to read, by the media player executed at the microcontroller, first audio data from the non-volatile memory; and write, by the media player executed at the microcontroller, second audio data representing the first audio data to an audio memory space of the RAM, wherein an audio controller is configured to read audio data from the audio memory space.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 1:
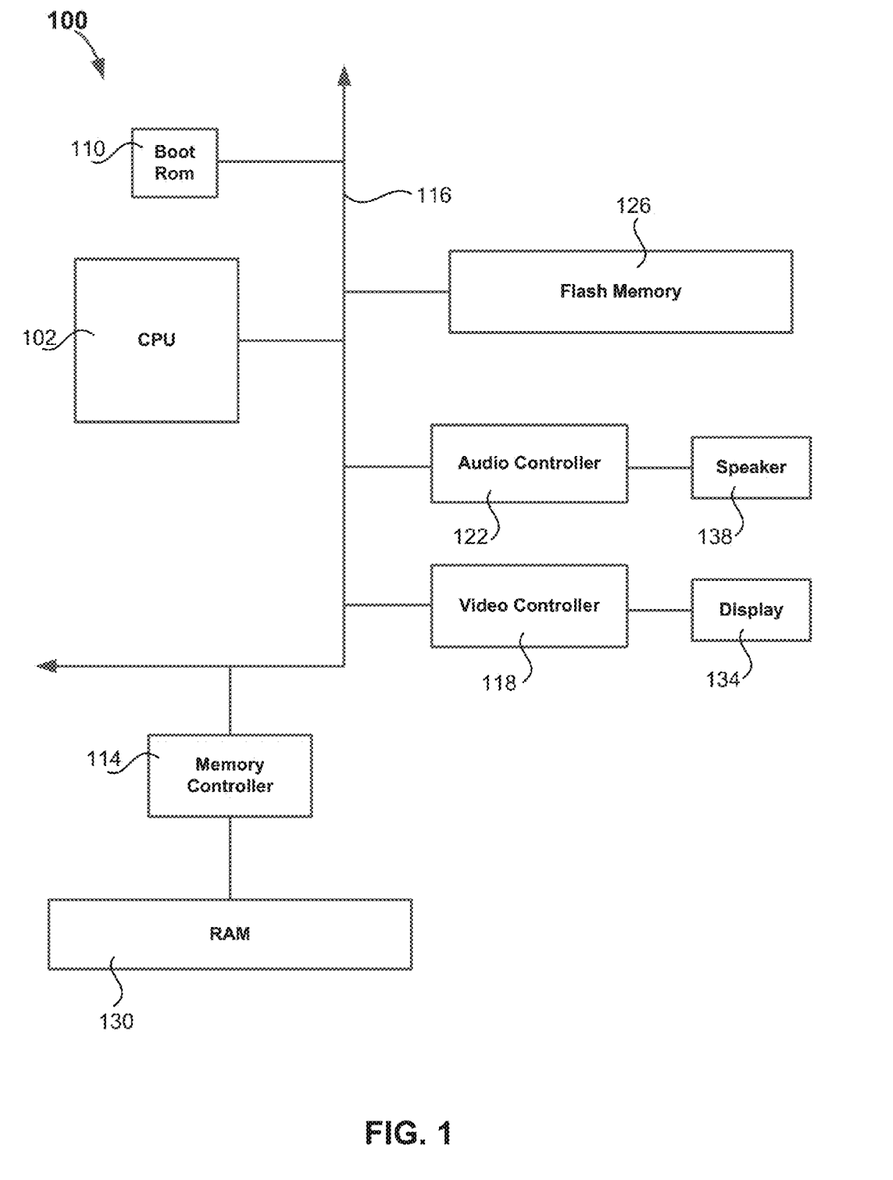
FIG. 1 schematically illustrates a computing device in accordance with certain embodiments of the present disclosure.

FIG. 1 schematically illustrates a computing device 100 in accordance with certain embodiments of the present disclosure. The computing device 100 can be any kind of computing device such as a desktop computer, a laptop computer, a tablet computer, a smart phone, a smart TV, etc. In certain embodiments, the computing device 100 includes a CPU 102, a boot rom 110, a memory controller 114, the video controller 118, an audio controller 122, and a non-volatile memory (such as a flash memory) 126, which are in communication with each other through a system bus 116. Further, the memory controller 114 controls access to a random access memory (RAM) 130. The video controller 118 is in communication with a display device 134. The audio controller 122 is in communication with a speaker 138. The computing device 100 can include other physical or virtual components not shown in FIG. 1.

The CPU 102 can be any suitable types of processors such as an INTEL X86 processor, an INTEL ATOM processor or an ARM processor, or other microcontrollers.

In certain embodiments, the boot rom 110 contains the initial code that the CPU 102 executes after a power-on or reset. For example, the initial code can include necessary code and configurations that enables the CPU 102 to initialize the flash memory 126. Then, the initial code can instruct the CPU 102 to load a boot program 308 from a predetermined location in the flash memory 126. In certain embodiments, the boot rom 110 can be a small piece of mask ROM or write-protected flash embedded inside the processor chip, an EPROM, etc.

Figure 2:
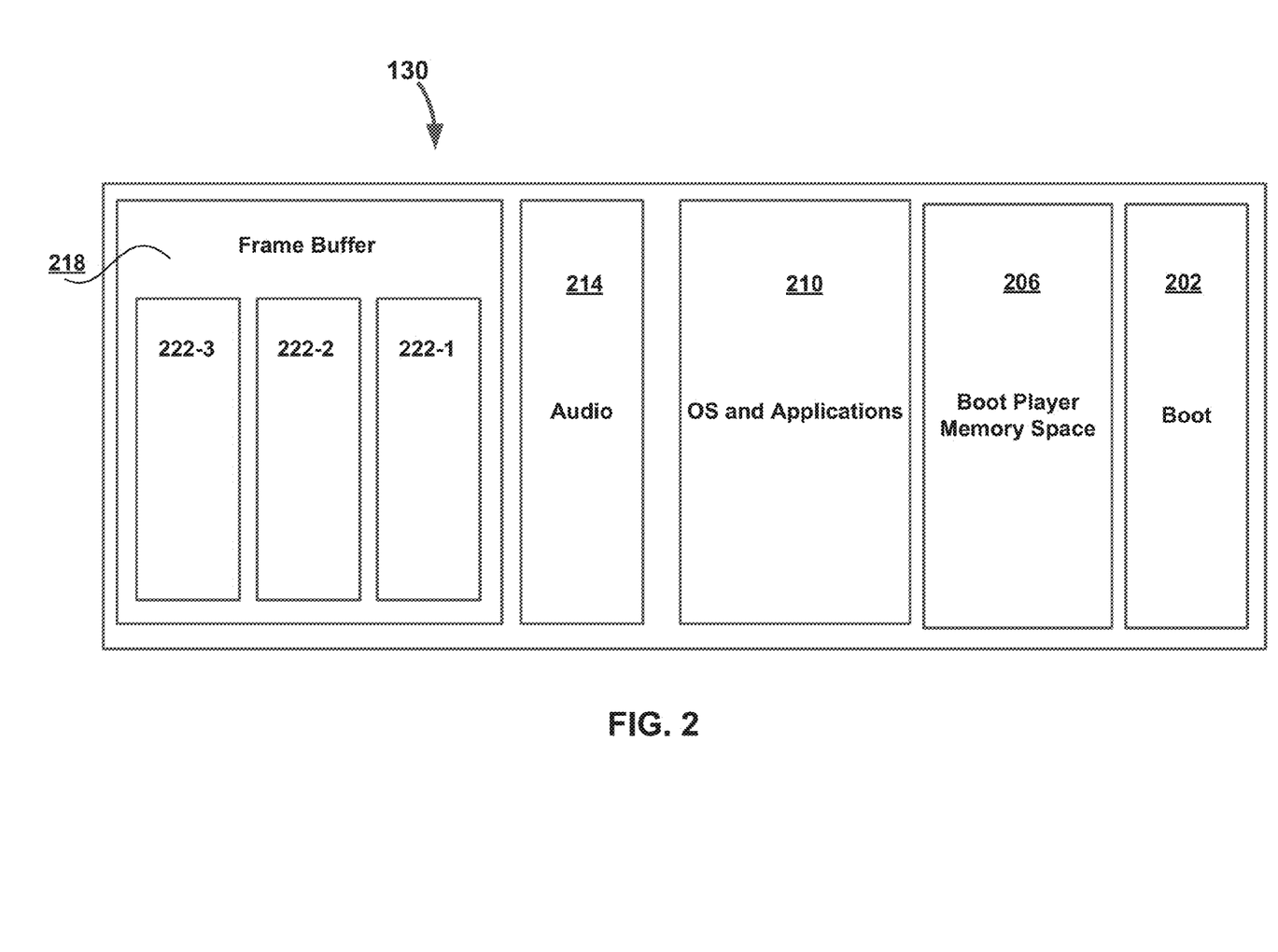
FIG. 2 schematically illustrates a RAM configuration in accordance with certain embodiments of the present disclosure.

FIG. 2 schematically illustrates a RAM 130 configured in accordance with certain embodiments of the present disclosure. The memory controller 114 and the RAM 130 can be any suitable types, such as DDR3. The RAM 130 has a boot memory space 202 that is utilized by the boot program 308, and a kernel and user space 210 that is utilized by an operating system 312 and other applications (e.g., a converter application 316) on the operating system 312. The boot memory space 202 can have a boot player memory space 206 that is utilized by a boot player 338. In addition, the RAM 130 can have an audio memory space 214. The audio memory space 214 can be accessed by the CPU 102 and the audio controller 122. Further, the RAM 130 can have a frame buffer 218 that has one or more graphic planes 222. In certain embodiments, a graphic plane 222-3 of the graphic planes 222 can be a Graphic Sprite Plane. The frame buffer 218 can be accessed by the CPU 102 and the video controller 118.

Figure 3:
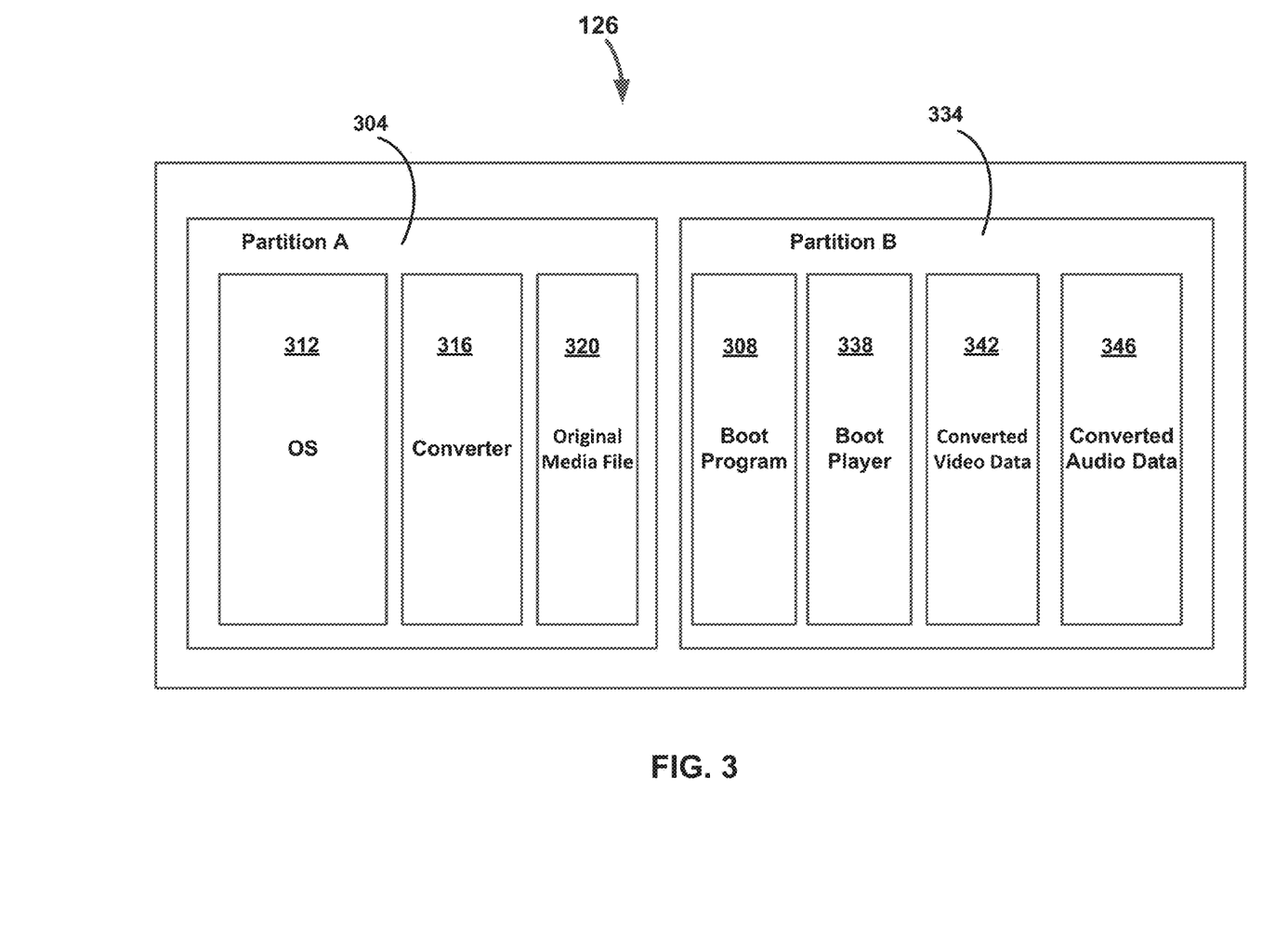
FIG. 3 schematically illustrates a non-volatile memory in accordance with certain embodiments of the present disclosure.

FIG. 3 schematically illustrates a non-volatile memory 126 such as a flash memory or a hard drive in accordance with certain embodiments of the present disclosure. The flash memory 126 is used here as an example. The flash memory 126 can have a partition A 304 and a partition B 334.

The partition A 304 can include an operating system 312 (or kernel), a converter application 316, a media file in a format (i.e., an original media file) 320, and other applications (not shown).

The operating system 312 can be collective management software managing the operation and resources of the computing device 100. For example, the operating system 312 can include a set of functional programs that control and manage operations of the devices connected to the CPU 102. The set of application programs provide certain utility software for the user to manage the computing device 100. In certain embodiments, the operating system is operable to multitask, i.e., execute computing tasks in multiple threads, and may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP operating system, APPLE's MACINTOSH OSX operating system, LINUX operating system, UNIX operating system, etc.

In certain embodiments, the operating system 312, when booted, can launch one or more applications. For example, a downloader application can periodically download one or more media files from a network location and then store the media files in this original file format in the partition A 304. Those media files are referred to as original media files.

The original media file 320 can be stored in the partition A 304 manually, or can be downloaded by an application of the computing device 100 from a network location to the partition A 304. The original media file 320 can be in any video formats such as YUV 4:2:2.

The converter application 316 can, when executed by the CPU 102, convert the original media file 320 into converted video data 342 and converted audio data 346, which collectively can be used to display the media content of the original media file 320. The converted video data 342 is in a converted video format. The converted video format can be a format that is supported by the video controller 118 such as RGB 8:8:8 or raw format. The video format of the converted video data 342 can alternatively be a format that is optimized for the boot player 338 to further process the converted video data 342 to generate data in the format (e.g., raw format) that can be directly used by the video controller 118. Further, the converted video data 342 is generated using a frame rate that is in accordance with the frame rate of the boot player 338 as described below. For example, the frame rate can be about 30 frames per second. In other words, for example, for a video to be played for one second, the converted video data 342 can contain 30 sections of data, where each section of data specifies the pixel values for one video frame.

In certain embodiments, the converted audio data 346 are used to generate the audio accompanying the video content of the converted video data 342. The converted audio data 346 can be divided into multiple sections each containing audio data for a predetermined time. For example, the time period can be one second or 1/30 second.

Further, the converter application 316 can store the converted video data 342 in the partition B 334 at a preset location where the boot player 338 is configured to access as described below.

The partition B 334 can include, at a predetermined location (address), the boot program 308. The boot program 308 includes code and configurations that, when executed by the CPU 102, can test and initialize some or all of the components of the computing device 100. Further, the boot program 308 includes code and configurations that, when executed by the CPU 102, can detect a bootable device, an active partition of the bootable device, and an operating system of the active partition.

The partition B 334 can also include a boot player 338 as well as the converted video data 342 and the converted audio data 346 saved by the converter application 316. In certain embodiments, the boot program 308 can initiate the boot player 338 in a separate process or thread from main booting process or thread.

The boot player 338, when executed by the CPU 102, can read video frame data from the converted video data 342 in the partition B 334 of the flash memory 126 and write the frame data to the frame buffer 218 of the RAM 130. In certain embodiments, the boot player 338 can read and write the video frame data in a predetermined frame rate such as 30 frames per second. In other words, every 1/30 of a second, the boot player 338 reads data of one video frame, processes the data when necessary, and then writes the data to the frame buffer. In certain embodiments, the boot player 338 is configured with the size (bytes) of the data for one frame and the starting location of the converted video data 342 in the partition B 334. Thus, the boot player 316 can read at the starting location the number of bytes data specifying one video frame, and record the ending location. After 1/30 of a second, the boot player 338 can read the number of bytes data specifying the subsequent video frame from the location immediately after the ending location.

The boot player 338 is utilized in a booting process and may not be a full-fledged media player. For example, the boot player 338 can be a simple, small, and efficient media player that supports only a few formats. Therefore, in certain embodiments, the converter application 316 can convert the original media files 320 in various formats into the file formats that are supported by the boot player 338. For example, in those supported file formats the media data can be minimally or less compressed using simple algorithms. Therefore, the operations of the boot player 338 are relatively simple, less resource consuming, and less time consuming.

In certain embodiments, when the converter application 316 converts the original media file 320 to the converted video data 342 in a format supported by the video controller 118, the boot player 338 can be configured to instruct the CPU 102 to read the converted video data from the partition B 334 and then writes the converted video data 342 directly to the frame buffer 218. In other words, the boot player 338 does not need to further process the converted video data 342.

In certain embodiments, the boot player 338 reads a section of audio data from the converted audio data 346 stored in the partition B 334. The boot player 338 can, when necessary, process the section of audio data to generate audio data supported by the audio controller 122 and write those data to the audio memory space 214. The section of audio data can specify the audio for the entire duration of the media content or a predetermined time period such as one second. The boot player 338 writes the video data and audio data to the frame buffer 218 and the audio memory space 214, respectively, in a synchronized manner. This way, the video played at the display device 134 and the audio played at the speaker 138 are synchronized as required by the media content of the original media file 320.

Figure 4A:
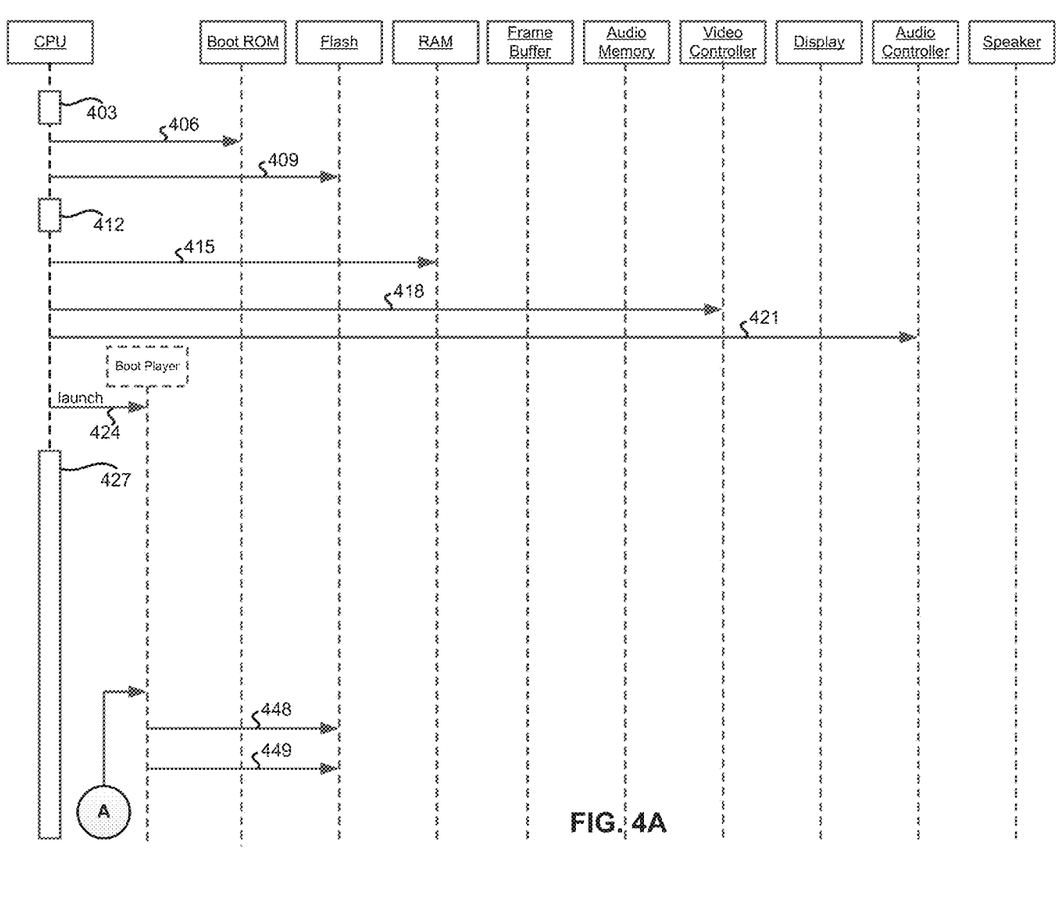
FIGS. 4A and 4B schematically illustrate a process of the operations of the computing device in accordance with certain embodiments of the present disclosure.
Figure 4B:
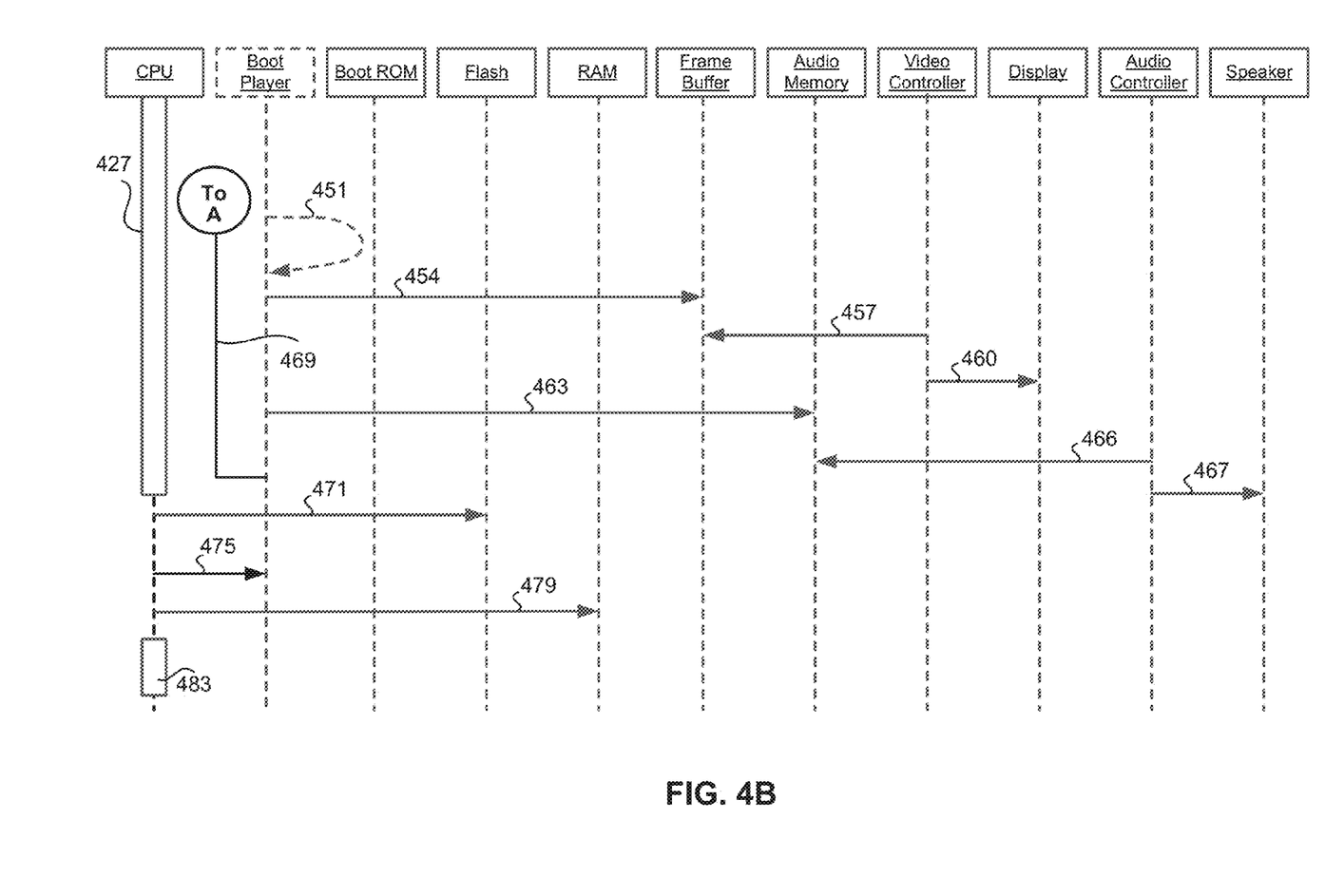

FIGS. 4A and 4B schematically illustrate a process of the operations of the computing device 100 in accordance with certain embodiments of the present disclosure. At operation 403, the CPU 102 is reset or powered on. In certain embodiments, the CPU 102 can be configured to initially load code and configurations stored in the boot rom 110. Thus, at operation 406, the CPU 102 loads and executes the code and the configurations stored in the boot rom 110. The code and the configurations, when necessary, can initialize the flash memory 126. Therefore, the CPU 102 can access the flash memory 126. At operation 409, the code and the configurations can load the boot program 308 from a preset location of the partition B 334 of the flash memory 126. The boot program 308, at operation 412, starts a booting process. For example, at operation 415, the boot program 308 can initialize the memory controller 114 and the RAM 130. The boot program 308 can configure the memory spaces as described above.

At operation 418, the boot program 308 can initializes the video controller 118. At operation 421, the boot program 308 can initialize the audio controller 122. At operation 424, the boot program 308 can read the boot player 338 from the partition B 334 of the flash memory 126 and subsequently launches the boot player 338 in a thread or process separate from the main process or thread of the boot program 308.

At operation 427, in the main process or thread of the boot program 308, the boot program 308 continues testing and initializing the other components on a chipset or a motherboard as well as other hardware of the computing device 100.

On the other hand, while the boot program 308 is in operation 427, at operation 448, the boot player 338 fetches, into the boot player memory space 206, video data of a video frame from the location of the partition B 334 where the converted video data 342 is stored. In certain embodiments, the fetched frame data may not be in a format that can be directly used by the video controller 118. At operation 449, similarly, the boot player 338 fetches, into the boot player memory space 206, a section of the converted audio data from the partition B 334.

At operation 451, the boot player 338 processes the fetched frame data and converts them into a format that is supported by the video controller 118. For example, the boot player 338 can convert the fetched frame data into a raw format. Similarly, the boot player 338 processes the fetched audio data and converts them into a format that is supported by the audio controller 122.

At operation 454, the boot player 338 writes the converted frame data to the frame buffer 218. At operation 457, the video controller 118 reads the converted frame data from the frame buffer 218. At operation 460, the video controller 118 generates video signals in accordance with the converted frame data and outputs the video signals to the display device 134.

Concurrently or at substantially the same time with operation 454, at operation 463 the boot player 338 writes the converted audio data to the audio memory space 214. At operation 466, the audio controller 122 generates audio signals in accordance with the converted audio data. At operation 467, the audio controller 122 outputs the audio signals to the speaker 138.

At operation 469, the boot player 338, when necessary waits for a period of time, reenters operation 448 at the configured frame rate (e.g., 30 frames per second) to fetch the frame data of the next frame.

At the same time, at operation 427, the boot program 308 in the main process or thread brings the hardware of the computing device 100 to at least a basic operable state. At operation 471, the boot program 308 operates to detect a bootable partition for loading an operating system. In this example, the boot program 308 detects that the partition A 304 of the flash memory 126 is the bootable partition.

At operation 475, the boot program 308 terminates the process or the thread of the boot player 338. Subsequently, at operation 479, the boot program 308 loads a loader program of the operating system 312 from the flash memory 126 into the RAM 130. At operation 483, the boot program passes control of the CPU 102 to the loader program, which in turn loads and boots the operating system 312.

In certain embodiments, in addition to the protected mode (i.e. the native operating mode of the processor), the CPU 102 can operate in a system management mode (SMM). SMM can be entered through activation of an external system interrupt pin (SMI#), which generates a system management interrupt (SMI), or other soft mechanism. In SMM, the processor switches to a separate address space while saving the context of the currently running program or task. SMM-specific code may then be executed transparently. Upon returning from SMM, the processor is placed back into its state prior to the SMI.

Figure 5:
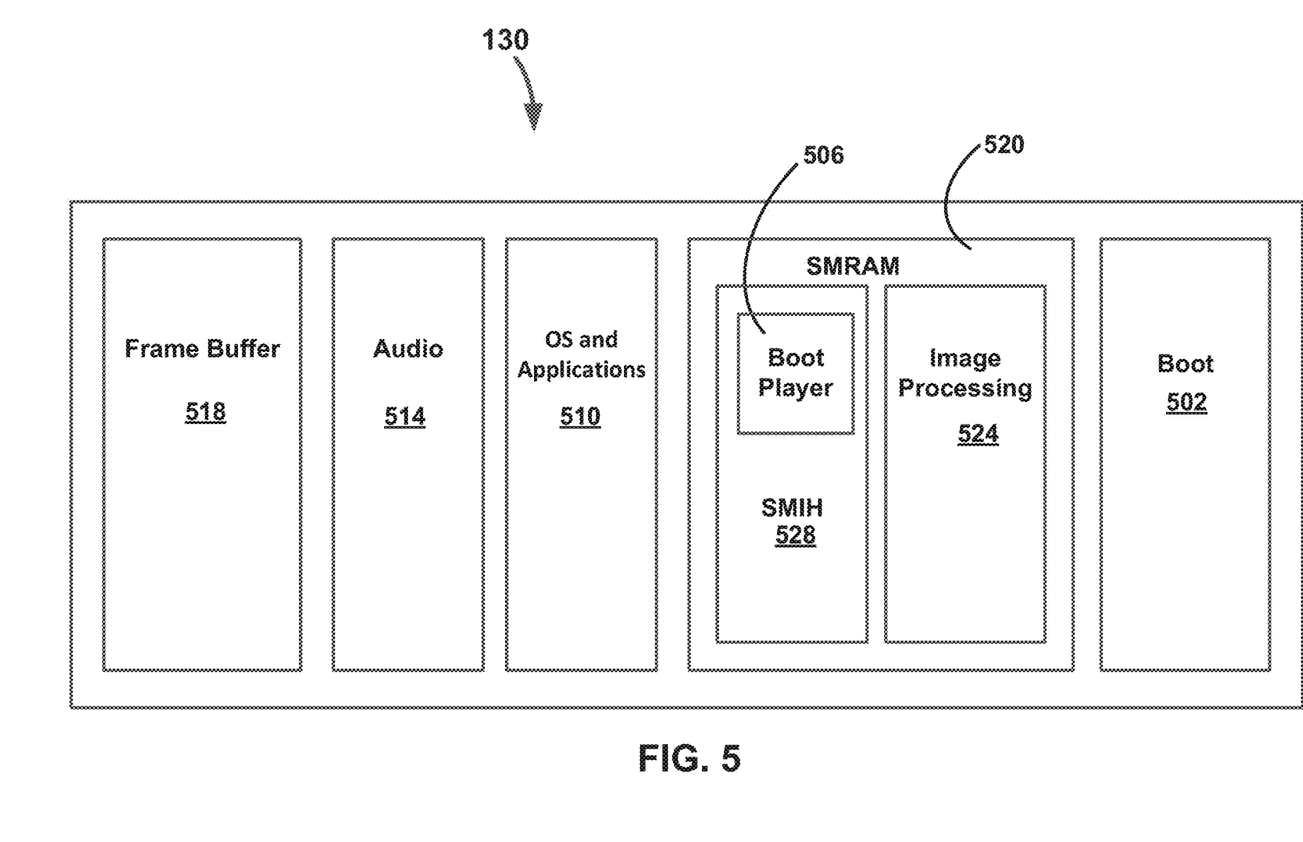
FIG. 5 schematically illustrates another RAM configured in accordance with certain embodiments of the present disclosure.

FIG. 5 illustrates a RAM structure that is configured to support the CPU 102 to operate in the SMM. The RAM 130 has a boot memory space 502 that is utilized by the boot program 308, and a kernel and user space 510 that is utilized by an operating system 312 and other applications (e.g., a converter application 316) on the operating system 312. The RAM further has a system management RAM space (SMRAM) 520. The SMRAM 520 can have a system management interrupt handler space 528, which may include a boot player memory space 506 that is utilized by the boot player 338. The SMRAM 520 can also have an image processing space 524 that is utilized by the boot player 338 for processing image frames. In addition, the RAM 130 can have an audio memory space 514. The audio memory space 514 can be accessed by the CPU 102 and the audio controller 122. Further, the RAM 130 can have a frame buffer 518 that has one or more graphic planes. The frame buffer 518 can be accessed by the CPU 102 and the video controller 118.

In SMM, the processor switches to a separate address space while saving the context of the currently running program or task. SMM is a special purpose operating mode provided for handling system-wide functions like power management, system hardware control, or proprietary OEM-designed code. It is intended for use only by system firmware, not by applications software or general-purpose systems software. The main benefit of SMM is that it offers a distinct and easily isolated processor environment that operates transparently to the operating system or executive and software applications.

When SMM is invoked through a system management interrupt (SMI), the processor saves the current state of the processor (the processor's context), then switches to a separate operating environment contained in system management RAM (SMRAM). While in SMM, the processor executes SMI handler code to perform operations such as powering down unused disk drives or monitors, executing proprietary code, or placing the whole system in a suspended state. When the SMI handler has completed its operations, it executes a resume (RSM) instruction. This instruction causes the processor to reload the saved context of the processor, switch back to protected or real mode, and resume executing the interrupted application or operating system program or task.

In certain embodiments, while in SMM, the processor executes code and stores data in the SMRAM space. The SMRAM space is mapped to the physical address space of the processor and for example can be within the Processor Address Space up to 4 GBytes in size. The processor uses this space to save the context of the processor and to store the SMI handler code, data and stack. It can also be used to store system management information (such as the system configuration and specific information about powered-down devices) and OEM-specific information.

As an example, the default SMRAM size can be 64 KBytes beginning at a base physical address in physical memory called the SMBASE. The SMBASE default value following a hardware reset can be for example 30000H. The processor looks for the first instruction of the SMI handler at the address [e.g., SMBASE+8000H]. It stores the processor's state in the area from for example [SMBASE+FE00H] to [SMBASE+FFFFH]. The system logic is minimally required to decode the physical address range for the SMRAM from [SMBASE+8000H] to [SMBASE+FFFFH]. A larger area can be decoded if needed. The size of this SMRAM can be between 32 KBytes and 4 GBytes. The location of the SMRAM can be changed by changing the SMBASE value. The actual physical location of the SMRAM can be in system memory or in a separate RAM memory.

As an example, the default base address for the SMRAM can be 30000H. This value can be contained in an internal processor register called the SMBASE register. The operating system or executive can relocate the SMRAM by setting the SMBASE field in the saved state map (e.g., at offset 7EF8H) to a new value. The RSM instruction reloads the internal SMBASE register with the value in the SMBASE field each time it exits SMM. All subsequent SMI requests will use the new SMBASE value to find the starting address for the SMI handler (e.g., at SMBASE+8000H) and the SMRAM state save area (e.g., from SMBASE+FE00H to SMBASE+FFFFH).

In certain embodiments, the boot program 308 can set up the configurations such that the CPU 102 to execute the boot player 338 in SMM and display the converted video data 342. In certain embodiments, the video controller 118 may not support the video format of the converted video data 342. For example, the video controller 118 may not support video frame data in the format (e.g. YUV 4:2:2) of the original media file 320, but only supports video data in some other video formats (e.g. RGB 8:8:8). In these circumstances, the boot program 308 operating in the SMM can convert the video frame data to a format that is supported by the video controller 118.

In certain embodiments, after initializing the components of the computing device 100 as described in operations 403 to 421 above, the boot program 308 can set up the SMBASE value in the SMBASE register. Further, the boot program 308 can load set up the boot player 338 as part of the SMI handler. Alternatively, the boot program 308 can load an SMM loader program into the SMI handler. When executed by the CPU 102, the SMM loader program can load the boot player 338 into the SMRAM and then transfer control of the CPU 102 to the boot player 338.

Further, the boot program 308 can configure the image processing space 524 in the SMRAM for storing video frame data retrieved from flash memory 126. The size of the image processing space 524 is configured to be at least sufficient to store video data for a single frame. For example, video data for a frame having 720×480 pixels and in YUV 4:2:2 format roughly have 700 KBytes. Accordingly, the size of the image processing space 524 is set to be about 700 KBytes to 1 Mbytes.

In addition, in certain embodiments, the boot program 308 can set up an SMI timer that can be configured to issue an SMI to the CPU 102 at a predetermined time interval. For example, the boot program 308 can set up the SMI timer to issue an SMI about every 32 ms.

In certain embodiments, the boot program 308, in an operation similar to operation 427 described above, continues a booting process of testing and initializing the other components on a chipset or a motherboard as well as other hardware of the computing device of the computing device 100.

Further, the boot program 308 also detects the location of the operating system loader program in one or more storage devices of the computing device 100. Upon detecting the OS loader program, the boot program 308 loads the OS loader program from a storage device and then transfer control of the CPU 102 to the OS loader program. Subsequently, the OS loader program starts loading the OS from the storage device into the memory and transfer control of the CPU 102 to the OS.

In certain embodiments, the boot program 308 configures the SMI timer to issue an system management interrupt at each predetermined time interval, e.g., roughly about every 32 ms. Further, the SMI timer can be configured to issue to the CPU 102 an SMI during the booting process and at each predetermined time interval. In response to the SMI, the CPU 102 saves the processor's context relating to loading the operating system in the SMRAM, enters SMM, and begins to execute the SMI handler. The SMI handler itself can include the boot player 338. Alternatively, the SMI handler can have a loader program that loads the boot player 338 from the partition B 334 of the flash memory 126. Therefore, the SMI handler launches the boot player 338.

The image frame is represented by pixel values in the format of the converted video data and for example in YUV color space. In this example, the YUV image data also has a 4:2:2 sub-sampling rate. That is, the two chroma components are sampled at half the sample rate of luma; the horizontal chroma resolution is halved. In certain embodiments, each of the luma and chrominance components has a value represented by a byte (8-bit). Thus, for the YUV 4:2:2 data, every four bytes represent two pixels.

In certain embodiments, the boot player 338 fetches, into the image processing space 524, video data of a video frame from the location of the partition B 334 where the converted video data 342 is stored. As stated above, the format of the video frame data (e.g. YUV 4:2:2) may not be supported by the video controller 118. Therefore, the boot player 338 can convert the video frame data in the format of the converted video data (e.g. YUV 4;2:2) stored in the image processing space 524 into video frame data in a format (e.g. RGB 8:8:8) supported by the video controller 118.

The boot player 338 can use the floating-point calculation to convert the video frame data in the format of the converted video data to the video frame data in the video controller 118's format. For example, if the format of the converted video data is YUV 4:2:2 and the video controller 118's format is RGB 8:8:8, the pixel values represented in YUV color space can be converted to pixel values represented in RGB color space using the below equation.

$$\begin{bmatrix} R \\ G \\ B \end{bmatrix} = \begin{bmatrix} 1.164 & 0 & 1.596 \\ 1.164 & -0.391 & -0.813 \\ 1.164 & 2.018 & 0 \end{bmatrix} \left( \begin{bmatrix} Y \\ U \\ V \end{bmatrix} - \begin{bmatrix} 16 \\ 128 \\ 128 \end{bmatrix} \right)$$

In certain embodiments, the CPU 102 supports single-instruction, multi-data (SIMD) instructions. The boot player 338 accordingly uses the SIMD instructions to convert the video frame data from one format to another. For example, when an INTEL X86 processor is used in the computing device 100, the boot player 338 uses MMX instructions. Typically for a processor supporting SIMD instructions, the processor has multiple SIMD registers that each can be divided into blocks having a predetermined number of bytes (or bits) on which computation can be simultaneously operated. For example, a SIMD register can be a 64-bit register; and computations with this register can operate simultaneously on two four-byte values, four two-byte values, or eight single bytes. Accordingly, the boot player 338 can use SIMD instructions to instruct the CPU 102 to load values of 4 pixels in YUV 4:2:2 format stored in the image processing space 524, i.e. 64 bits, into a single SIMD register. Then, computations can operate simultaneously on 8 single byte blocks to generate values of the 4 pixels in RGB 8:8:8 format, i.e. 128 bits, which are temporarily stored in one or more SIMD registers. Subsequently, the boot player 338 instructs the CPU 102 to write the pixel values in RGB format to the frame buffer 518.

As described above, the boot player 338 instructs the CPU 102 to convert the frame data stored in the image processing space 524 to frame data in a format supported by the video controller 118. Subsequently, the CPU 102 writes the converted pixel values to the frame buffer 518. The frame buffer 518 may have multiple planes such as Planes A, B, and C. In this example, the boot player 338 instructs the CPU 102 to write the converted pixel values into one of the planes such as Plane A.

In certain embodiments, the frame buffer 518 can be easily accessible, and data can be directly written into the frame buffer 518 using 32-bit BGRA (BLUE, GREEN, RED, ALPHA) format. The YUV to RGB conversion will be done using INTEL MMX instruction and the code can be written in C++ with in-line MMX assembly instruction, so that the conversion is quicker and time efficient.

Further, the video controller 118 is configured to read data, through the system bus 116, from the frame buffer 518. Thus, video controller 118 can retrieve the converted image data from the frame buffer 518, process the converted image data, and further utilize a display driver to generate video output signals based on the converted image data. In this manner, a display device 134 connected with the output of the display driver can display the video images in accordance with the video signals output by the display driver.

The boot player 338 also determines whether the operating system has been completely booted. After the operating system has been booted, the boot player 338 can terminate the SMI timer.

Figure 6:
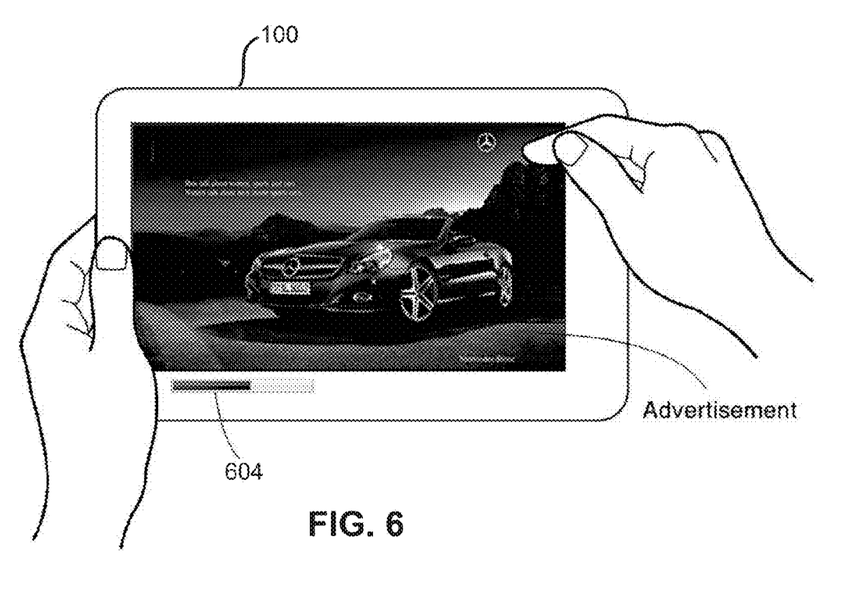
FIG. 6 illustrates a screen display during a booting process in accordance with certain embodiments of the present disclosure.

After the boot player 338 writes the data representing an image frame to the frame buffer 518, the boot player 338 returns control back to the SMI handler. The video controller, on the other hand, can display the image frame at the display device 134. For example, as shown in FIG. 6, the image frame can represent an advertisement. In addition, in certain embodiments, the boot player 338 can display a status of the booting process, for example, through a process bar 604. The boot program 308 and the operating system can write the booting status in a specific memory space of the SMRAM. The boot player 338 can then read the booting status from that member space and display the status in a predetermined manner, such as through the process bar 604.

In certain embodiments, the video controller 118 may support the video format of the converted video data. For example, the video controller 118 may support frame data YUV 4:2:2 format. In this instance, it is not necessary to use the boot player 338 to convert the video frame data from one format to another. Therefore, the boot player 338 can write the video frame data to the frame buffer 518. For example, the frame buffer 518 can be a SPRITE C graphic plane. Further, the video controller 118 is configured to read data, through the system bus 116, from the frame buffer 518.

When the SMI handler has completed its operations, it executes a resume (RSM) instruction. This instruction causes the processor to reload the saved context of the processor, switch back to protected or real mode, and resume interrupted task such as booting the operating system.

Therefore, after the CPU 102 exits the SMM, it continues executing the boot program 308 to boot the operating system. The boot program 308 and the operating system can be configured to boot in a non-graphic mode. Therefore, as shown in FIG. 6, during the booting process, the computing device 100 only displays the media content from the converted video data 342.

Figure 7:
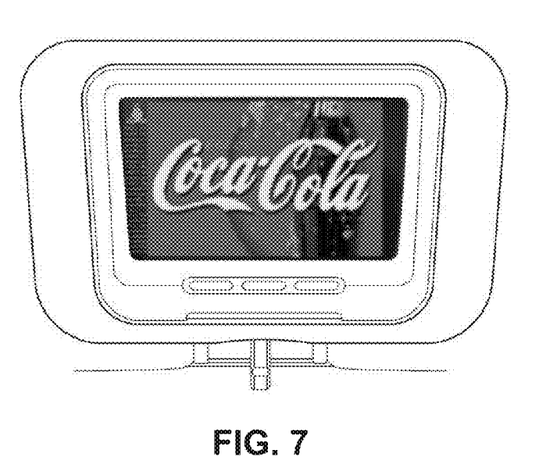
FIG. 7 illustrates another screen display during a booting process in accordance with certain embodiments of the present disclosure.

In certain embodiments, as shown in FIG. 7, the boot program 308 and the operating system can be configured to boot in a graphic mode. Accordingly, the boot player 338 can be configured to overlap, in the frame buffer, the image from the converted video data 342 with the booting image generated by the boot program 308 and the operating system.

In certain embodiments, the boot program 308 and operating system can be configured to terminate the SMI timer at a predetermined point of the booting process or after the booting process is complete. For example, the operating system can be configured to terminate the SMI timer just before displaying the login screen on the display device 134. Typically, the boot program 308 has the function that can terminate the SMI timer. The operating system can call that function through an interface, such as Unified Extensible Firmware Interface (UEFI), between the operating system and the boot program 308.

In certain embodiments, the boot program can also provide a function that activates the SMI timer. Therefore, during the shutdown process of the operating system, the operating system can call that function, through the interface between the operating system and the boot program 308, to activate the SMI timer. Subsequently, the SMI timer can issue SMIs to the CPU 102, which accordingly enters into SMM and executes the boot player 338 to display media content as described above.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:
1. A computing device, comprising:
a processor;
a random access memory (RAM) having a frame buffer;
a video controller configured to read video data from the frame buffer; and a non-volatile memory storing
an operating system;
a boot program;
a media player; and
first video data,
wherein the processor, the RAM, the video controller, and the non-volatile memory are in communication with each other;
wherein the processor is configured to load the boot program to the RAM and execute the boot program;
wherein the boot program is configured to, when executed at the processor in a first process or thread,
load the media player and execute the media player in a second process or thread separate from a first process or thread,
terminate the media player executed in the second process or thread, and
in response to termination of the media player executed in the second process or thread is completed, boot the operating system in the first process or thread,
wherein the media player is configured to, when executed by the processor,
read the first video data from the non-volatile memory, and
write second video data representing the first video data to the frame buffer.

2. The computing device of claim 1, wherein the first video data is in a first video format, wherein the second video data is in a second video format supported by the video controller, wherein the media player is configured to convert the first video data to the second video data.

3. The computing device of claim 1, wherein the first video data are in a format supported by the video controller, wherein the second video data are the same as the first video data, wherein the media player is configured to read the first video data from the non-volatile memory and writes the first video data directly to the frame buffer.

4. The computing device of claim 1, wherein the boot program is configured to, when executed by the processor, initialize the RAM and the video controller.

5. The computing device of claim 1, wherein the boot program is configured to terminate the media player before loading a loader of the operating system into the RAM.

6. The computing device of claim 1, wherein the non-volatile memory further stores a converter application that is configured to run on the operating system, and
wherein the converter application is configured to, when executed by the processor,
process a media file in a third video format to generate the first video data, and
store the first video data at a first predetermined location of the non-volatile memory.

7. The computing device of claim 6, wherein the media player is configured to, when executed by the processor, read video data at the first predetermined location.

8. The computing device of claim 7, wherein the non-volatile memory further stores a downloader application that is configured to run on the operating system,
wherein the downloader application is configured to, when executed by the processor,
download the media file from a network location.

9. The computing device of claim 1, comprising
a display device in communication with the video controller; and
an audio controller in communication with a speaker and configured to read audio data from an audio memory space of the RAM,
wherein the non-volatile memory further stores first audio data,
wherein the media player is configured to, when executed by the processor,
read the first audio data from the non-volatile memory, and
write second audio data representing the first video data to the audio memory space.

10. The computing device of claim 9, wherein the operating system is stored in a first partition of the non-volatile memory, and
wherein the boot program, the media player, the first video data, and first audio data are stored in the second partition of the non-volatile memory.

11. A method of booting a computing device, comprising:
loading a boot program from a non-volatile memory into a random access memory (RAM) and executing, at a processor, the boot program in a first process or thread;
loading and executing, by the boot program executed at the processor, a media player in a second process or thread of the boot program separated from the first process or thread;
reading, by the media player executed at the processor, first video data from the non-volatile memory;
writing, by the media player executed at the processor, second video data representing the first video data to a frame buffer of the RAM, wherein a video controller is configured to read video data from the frame buffer;
terminating, by the boot program executed at the processor, the media player executed in the second process or thread, and
in response to termination of the media player executed in the second process or thread is completed, booting the operating system in the first process or thread.

12. The method of claim 11, further comprising:
converting, by the media player executed at the processor, the first video data in a first video format to the second video data in a second video format supported by the video controller.

13. The method of claim 11, wherein the first video data are in a format supported by the video controller, wherein the second video data are the same as the first video data, wherein the first video data is directly written to the frame buffer.

14. The method of claim 11, further comprising:
initializing, by the boot program executed at the processor, the RAM and the video controller.

15. The method of claim 11, further comprising:
terminating, by the boot program executed at the processor, the media player; and
after terminating the media player, loading, by the boot program executed at the processor, a loader of the operating system into the RAM.

16. The method of claim 11, further comprising:
loading a downloader application from the non-volatile memory to the RAM, and executing, at the processor, the downloader application on the operating system;
downloading, by the downloader application executed at the processor, a media file in a third video format from a network location;
loading a converter application from the non-volatile memory into the RAM, and executing, at the processor, the converter application on the operating system;
processing, by the converter application, the media file to generate the first video data; and storing, by the converter application executed at the processor, the first video data at a first predetermined location of the non-volatile memory.

17. The method of claim 16, further comprising:
reading, by the media player executed at the processor, video data at the first predetermined location.

18. The method of claim 11, further comprising
reading, by the media player executed at the processor, first audio data from the non-volatile memory; and
writing, by the media player executed at the processor, second audio data representing the first audio data to an audio memory space of the RAM, wherein an audio controller is configured to read audio data from the audio memory space.

19. A non-transitory computer readable medium storing computer executable codes for booting a computing device, wherein the codes are configured to
load a boot program from a non-volatile memory into a random access memory (RAM) and execute, at a processor, the boot program in a first process or thread;
load and execute, by the boot program executed at the processor, a media player in a second process or thread of the boot program separated from the first process or thread;
read, by the media player executed at the processor, first video data from the non-volatile memory;
write, by the media player executed at the processor, second video data representing the first video data to a frame buffer of the RAM, wherein a video controller is configured to read video data from the frame buffer;
terminate, by the boot program executed at the processor, the media player executed in the second process or thread, and
in response to termination of the media player executed in the second process or thread is completed, boot the operating system in the first process or thread.

20. The non-transitory computer readable medium of claim 19, wherein the first video data is in a first video format, wherein the second video data is in a second video format supported by the video controller, wherein the media player is configured to convert the first video data to the second video data.

21. The non-transitory computer readable medium of claim 19, wherein the first video data are in a format supported by the video controller, wherein the second video data are the same as the first video data, wherein the media player is configured to read the first video data from the non-volatile memory and writes the first video data directly to the frame buffer.

22. The non-transitory computer readable medium of claim 19, wherein the boot program is configured to terminate the media player before loading a loader of the operating system into the RAM.

23. The non-transitory computer readable medium of claim 19, wherein the codes comprise a downloader application and a converter application that are configured to run on the operating system,
wherein the downloader application is configured to, when executed by the processor, download a media file in a third video format from a network location; and
wherein the converter application is configured to, when executed by the processor,
process the media file to generate the first video data, and
store the first video data at a first predetermined location of the non-volatile memory.

24. The non-transitory computer readable medium of claim 23, wherein the media player is configured to, when executed by the processor, read video data at the first predetermined location.

25. The non-transitory computer readable medium of claim 19, wherein the codes are further configured to
read, by the media player executed at the processor, first audio data from the non-volatile memory; and
write, by the media player executed at the processor, second audio data representing the first audio data to an audio memory space of the RAM, wherein an audio controller is configured to read audio data from the audio memory space.

* * * * *